(12) United States Patent
Kobayashi et al.

(10) Patent No.: US 8,664,916 B2
(45) Date of Patent: Mar. 4, 2014

(54) CHARGING CONTROL DEVICE

(75) Inventors: Misayo Kobayashi, Hurakata (JP); Yuya Hasegawa, Kyoto (JP); Susumu Iida, Shinagawa-ku (JP)

(73) Assignee: Panasonic Corporation, Osaka (JP)

( * ) Notice: Subject to any disclaimer, the term of this patent is extended or adjusted under 35 U.S.C. 154(b) by 238 days.

(21) Appl. No.: 13/228,669

(22) Filed: Sep. 9, 2011

(65) Prior Publication Data

US 2012/0062168 A1 Mar. 15, 2012

(30) Foreign Application Priority Data

Sep. 10, 2010 (JP) ................................. 2010-203511

(51) Int. Cl.
*H01M 10/46* (2006.01)
(52) U.S. Cl.
USPC .......................................................... 320/109
(58) Field of Classification Search
USPC .................. 320/103, 104, 107, 128, 132
See application file for complete search history.

(56) References Cited

U.S. PATENT DOCUMENTS

2009/0229900 A1 9/2009 Hafner et al.
2011/0074350 A1* 3/2011 Kocher ..................... 320/109

FOREIGN PATENT DOCUMENTS

EP 2219278 A 8/2010
JP 10-80071 3/1998

OTHER PUBLICATIONS

Chinese Office Action dated Oct. 28, 2013 and English translation thereof.

* cited by examiner

*Primary Examiner* — Edward Tso
(74) *Attorney, Agent, or Firm* — Bacon & Thomas, PLLC

(57) ABSTRACT

A charging control device stores expected driving start time of each of motor vehicles and controls charging operations of the motor vehicles in such a manner as to finish charging a battery mounted to each of the motor vehicles by the corresponding expected driving start time. The charging control device includes a storage unit for storing the expected driving start time of each of the motor vehicles; and a control unit for searching the motor vehicles to find a specific motor vehicle whose charging is expected to be finished by the expected driving start time and causing the specific motor vehicle to discharge an electric power to be used in charging at least one of the motor vehicles other than the specific motor vehicle.

5 Claims, 7 Drawing Sheets

| USER ID NO. | ARRIVAL TIME | DEPARTURE TIME | TARGET CHARGING AMOUNT(B) [kwh] | RESIDUAL AMOUNT(A) [kwh] |
|---|---|---|---|---|
| 1 | 18:00 | 7:00 | 20 | 8 |
| 2 | 19:00 | 7:00 | 16 | 8 |
| ..... | | | | |
| M | 20:00 | 6:00 | 12 | 4 |

FIG.4B

| USER ID NO. | ARRIVAL TIME [FRAME NUMBER] | DEPARTURE TIME [FRAME NUMBER] | TARGET CHARGING AMOUNT(B') [SQUARE NUMBER] | RESIDUAL AMOUNT(A') [SQUARE NUMBER] |
|---|---|---|---|---|
| 1 | 7 | 20 | 10 | 4 |
| 2 | 8 | 20 | 8 | 4 |
| ..... | | | | |
| M | 9 | 19 | 6 | 2 |

FIG.5

OBJECTIVE
FUNCTION $$\min \sum_{i=1}^{M} E_i'$$

CONSTRAINTS $$\sum_{j=1}^{N} X_{ij} \geq Z_i' - E_i' \qquad i = 1,...,M$$

$$Z_i' = B_i' - A_i'$$

$$\sum_{i=1}^{N} X_{ij} + E_{com\,j} < L \qquad j = 1,...,N$$

$$E_i' =,..., = E_M' \quad OR \quad \sum_{i=1}^{M} (E_i' - \overline{E'})^2 = 0 \quad or \cong Q$$

$$X_{ij} \in \{0,1\} \qquad j \in S_i$$

$$X_{ij} = 0 \qquad j \notin S_i$$

| E' | RESERVE AMOUNT FRAME | X | CHARGING STATE | Z' | CHARGING-REQUIRED FRAME | A' | RESIDUAL AMOUNT FRAME |
|---|---|---|---|---|---|---|---|
| B' | TARGET CHARGING AMOUNT FRAME | Ecom | IN-USE ELECTRIC POWER FRAME | L | MAXIMUM ELECTRIC POWER FRAME | $\overline{E}$ | AVERAGE RESERVE AMOUNT FRAME |
| Q | DESIGNATED VALUE | S | CHARGEABLE FRAME NUMBER | M | NUMBER OF USERS | N | TIME FRAME NUMBER |

FIG. 6

OBJECTIVE FUNCTION $\quad \min \sum_{i=1}^{M} E_i'$

CONSTRAINTS $\quad \sum_{j=1}^{N} X_{ij} \geq Z_i' - E_i' \quad\quad\quad i = 1, ..., M$ $Z_i' = B_i' - A_i'$ $\sum_{i=1}^{N} X_{ij} + E_{com\ j} < L \quad\quad\quad j = 1, ..., N$ $\dfrac{E_i'}{Z_i'} =, ..., = \dfrac{E_M'}{Z_M'} \quad OR \quad \sum_{i=1}^{M} \{\dfrac{E_i'}{Z_i'} - (\overline{\dfrac{E'}{Z'}})\}^2 = 0 \quad or \cong Q$ $X_{ij} \in \{0, 1\} \quad\quad\quad j \in S_i$ $X_{ij} = 0 \quad\quad\quad j \notin S_i$

CHARGING CONTROL DEVICE

FIELD OF THE INVENTION

The present invention relates to a charging control device for controlling a charging operation of a battery mounted to a motor vehicle such as an electric car

BACKGROUND OF THE INVENTION

In recent years, there are available motor vehicles equipped with a battery and a motor, such as electric cars and plug-in hybrid cars. Since a multiple number of motor vehicles are simultaneously charged in collective housings or business institutions, the peak of power consumption is likely to soar in a specific time zone (e.g., in the evening) together with power consumption of other electric appliances.

In a prior art example disclosed in Japanese Patent Application Publication No. H10-80071 (JP10-80071A), an attempt is made to make the peak of power consumption uniform by distributing the charging start time points of a plurality of motor vehicles in the time zone (the midnight-electricity time zone) during which the electricity prices of a commercial electric power system (power company) remain relatively cheap.

However, if the charging start time points are distributed as in the prior art example disclosed in JP10-80071A, the motor vehicles which start charging operations at delayed charging start time points ought to finish the charging operations at delayed charging end time points. As the number of motor vehicles grows larger, it is more likely that the charging operations are not finished even after the lapse of the expected driving start time.

SUMMARY OF THE INVENTION

In view of the above, the present invention provides a charging control device capable of reducing the number of motor vehicles that fail to finish charging by the expected driving start time.

In accordance with an embodiment of the present invention, there is provided a charging control device for storing expected driving start time of each of motor vehicles and controlling charging operations of the motor vehicles in such a manner as to finish charging a battery mounted to each of the motor vehicles by the corresponding expected driving start time. The charging control device includes a storage unit for storing the expected driving start time of each of the motor vehicles; and a control unit for searching the motor vehicles to find a specific motor vehicle whose charging is expected to be finished by the expected driving start time and causing the specific motor vehicle to discharge an electric power to be used in charging at least one of the motor vehicles other than the specific motor vehicle.

The control unit may includes an information acquiring unit for acquiring information on a battery residual amount and a battery capacity from each of the motor vehicles; an estimating unit for estimating the time required to charge each of the motor vehicles to a target charging amount obtained by subtracting the residual amount from the battery capacity; and an opening-closing unit for opening or closing charging routes leading to the motor vehicles. The control unit may search the motor vehicles based on estimation results of the estimating unit to find a timely-chargeable motor vehicle that can be charged approximately to at least the target charging amount by the expected driving start time and a belatedly charged motor vehicle that cannot be charged to the target charging amount by the expected driving start time and then control the opening-closing unit to form a discharging route extending from the timely-chargeable motor vehicle to the belatedly charged motor vehicle.

The control unit may control the opening-closing unit to preferentially charge one of the motor vehicles smaller in the target charging amount than the remaining motor vehicles.

The charging control device may further include power supply lines extending from the motor vehicles to an electric appliance other than the motor vehicle. The control unit further may include a power-supply-line opening/closing unit for opening or closing the power supply lines and control the power-supply-line opening/closing unit to supply an electric power discharged from the motor vehicles to the electric appliance.

The charging control device of the present invention has an effect of reducing the number of motor vehicles that fail to finish charging by the expected driving start time.

BRIEF DESCRIPTION OF THE DRAWINGS

The objects and features of the present invention will be apparent from the following description of embodiments, given in conjunction with the accompanying drawings, in which.

DETAILED DESCRIPTION OF THE EMBODIMENTS

Figure 1A:
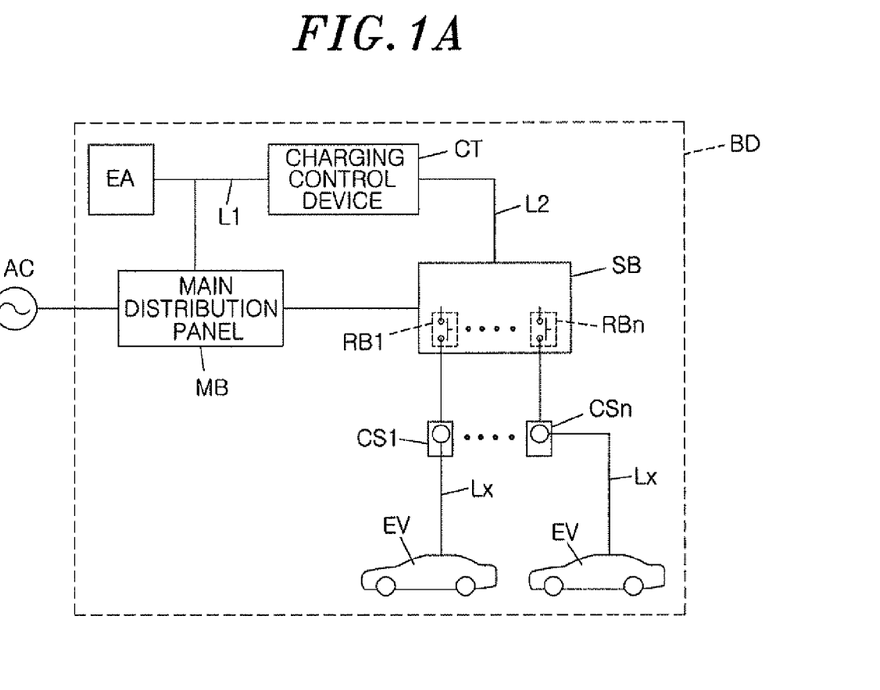
FIG. 1A is a system configuration diagram of a charging system including a charging control device in accordance with one embodiment of the present invention.

FIG. 1A shows a system configuration of a charging system including a charging control device CT in accordance with one embodiment of the present invention. The charging system is used to charge batteries (not shown) mounted to a plurality of motor vehicles (e.g., electric cars or plug-in hybrid cars) EV in a building BD such as a collective housing or a business institution. Each of the motor vehicles EV employed in the present embodiment includes a battery, a charger for charging the battery with an electric power (alternating current power) supplied from an external power source (outside the motor vehicles), a discharger for converting a direct current power discharged from the battery to an alternating current power and then outputting the alternating current power to the outside, and a charging-discharging control unit for controlling the charger and the discharger.

In the building BD, electric lines through which an alternating current power is supplied from a commercial alternating current power system AC are branched off in a main distribution board MB and an auxiliary distribution board SB. Although not shown in the drawings, a main breaker and a multiple number of branch breakers are accommodated in a box for the main distribution board MB.

An electric power is supplied to electric appliances (e.g., illumination devices and air-conditioning devices) in the building BD through the electric lines branched off from respective branch breakers.

Similarly, a main breaker and a multiple number of branch breakers are accommodated in a box for the auxiliary distribution board SB. Branch breakers of the auxiliary distribution board SB are composed of remote-controlled breakers RBi (i=1, 2, . . . , or n). An alternating current power is supplied to a plurality of sockets CSi (i=1, 2, . . . , or n) via the remote-controlled breakers RBi. Charging cables Lx serving as power supply lines through which an electric power is supplied to the motor vehicles EV in a below-mentioned manner are removably connected to the sockets CSi.

Figure 1B:
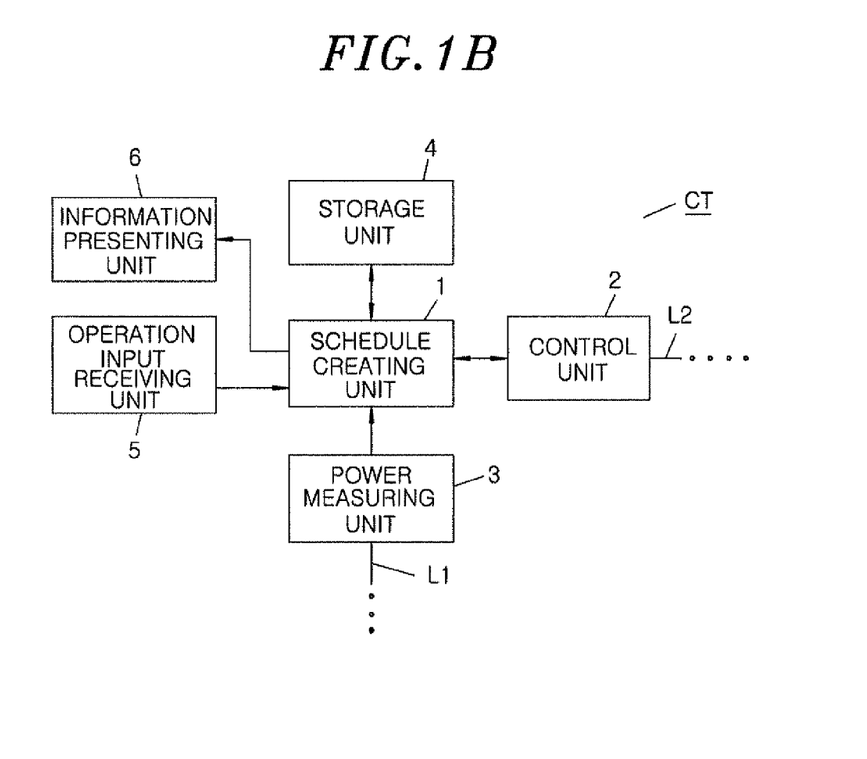
FIG. 1B is a block diagram showing the charging control device.

As shown in FIG. 1B, the charging control device CT includes a schedule creating unit 1, a control unit 2, a power measuring unit 3, a storage unit 4, an operation input receiving unit 5 and an information presenting unit 6. The power measuring unit 3 measures both the electric power (in-use power) supplied from the main distribution board MB and consumed by electric appliances within the building BD and the electric power (charging power) supplied from the auxiliary distribution board SB and charged to the motor vehicles EV. The measurement results of the power measuring unit 3 are stored in the storage unit 4 through the schedule creating unit 1.

The storage unit 4 is composed of an electrically-rewritable non-volatile semiconductor memory such as a flash memory and is designed to store the measurement results of the power measuring unit 3, the schedule to be set forth later and a variety of information on the motor vehicles EV. The operation input receiving unit 5 includes an input device such as a keyboard, a touch panel or an IC card reader. The operation input receiving unit 5 serves to receive various kinds of operation inputs inputted through the input device and transfer the operation inputs to the schedule creating unit 1.

The information presenting unit 6 includes a display device such as a liquid crystal monitor. The information presenting unit 6 presents a variety of information to a user by displaying letters or images on the display device. The information presenting unit 6 may be provided with a speaker to present information by outputting voices through the speaker.

The schedule creating unit 1 creates a schedule for charging the batteries of the motor vehicles EV. Pursuant to the schedule prepared by the schedule creating unit 1, the control unit 2 remotely controls the remote-controlled breakers RBi of the auxiliary distribution board SB through a control line L2, thereby independently opening or closing the charging routes leading to the respective motor vehicles EV and eventually starting or ending the charging operations of the respective motor vehicles EV.

Additionally, the control unit 2 has a function of detecting connection states of the sockets CSi and the charging cables Lx. The connection state detecting results for the respective sockets CSi are transferred to the schedule creating unit 1. The control unit 2 can allot specific identification symbols (user IDs) to individual users of the motor vehicles EV. The schedule creating unit 1 identifies the motor vehicles EV based on the user IDs. The ID numbers of the user IDs (1, 2, . . . , and M) are stored (registered) in the storage unit 4 of the charging control device CT.

The schedule creating unit 1, the control unit 2 and the power measuring unit 3 are made up of hardware such as a central processing unit and a memory and software (programs) for executing processes in the schedule creating unit 1, the control unit 2 and the power measuring unit 3.

The maximum electric power that can be received by the main distribution board MB and the auxiliary distribution board SB of the building BD is usually determined depending on the electric power specified by a contract with a power company. If a power generation installation such as a solar power generation system or a fuel cell system is provided in the building BD, the maximum electric power is determined by adding the electric power generated by the power generation installation to, the electric power specified by a contract with a power company. The information on the maximum electric power of the building BD (the maximum electric power values) is stored in the storage unit 4 of the charging control device CT.

Figure 3A:
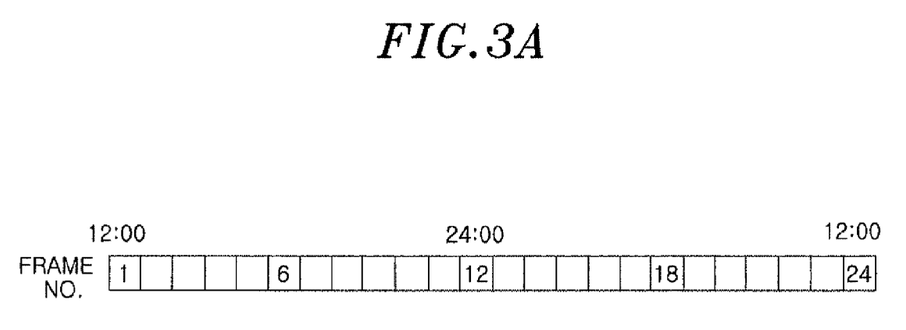
FIGS. 3A and 3B are explanatory views for explaining time frames and maximum electric power in the charging control device.
Figure 3B:
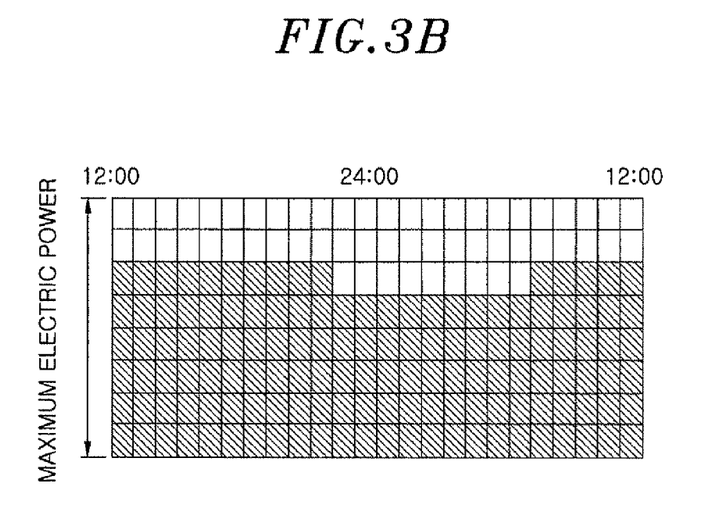

Referring to FIGS. 3A and 3B, the schedule creating unit 1 divides twenty four hours counted from 12:00 a.m. into twenty four time zones (time frames) on a hour-by-hour basis and allots frame numbers of 1 through 24 to the twenty four time frames (see FIG. 3A). The schedule creating unit 1 differentiates the maximum electric power values in the respective time frames using a plurality of squares (eight vertically-arranged squares in the illustrated example). While it is essentially preferable to divide the time frames on a unit of thirty minutes or less (preferably, on a unit of ten minutes), the time frames are divided on a one hour unit in the present embodiment for the sake of simplicity in description.

In the present embodiment, the electric energy amount of one square is equivalent to 2 kWh. The squares corresponding to the electric energy amount supplied to the electric appliances within the building BD through the main distribution board MB are hatched in FIG. 3B. Therefore, the non-hatched blank squares in FIG. 3B correspond to the electric energy amount that can be used in charging the motor vehicles EV through the auxiliary distribution board SB.

For example, in the one-hour time zone between 12:00 and 13:00 (the time frame of frame number 1) shown in FIG. 3B, the electric energy amount corresponding to six hatched squares (2×6=12 kWh) is consumed by the electric appliances. Thus, the electric energy amount corresponding to the remaining two non-hatched squares (2×2=4 kWh) can be used to charge the motor vehicles EV within the extent not exceeding the maximum electric power. Since, however, the in-use electric power to be consumed after creation of the schedule is essentially unknown, the schedule creating unit 1 estimates the in-use electric power in the respective time zones (time frames) in light of the past records of in-use electric power, the seasons and the weather, and then creates a schedule using the estimation results.

Figure 2A:
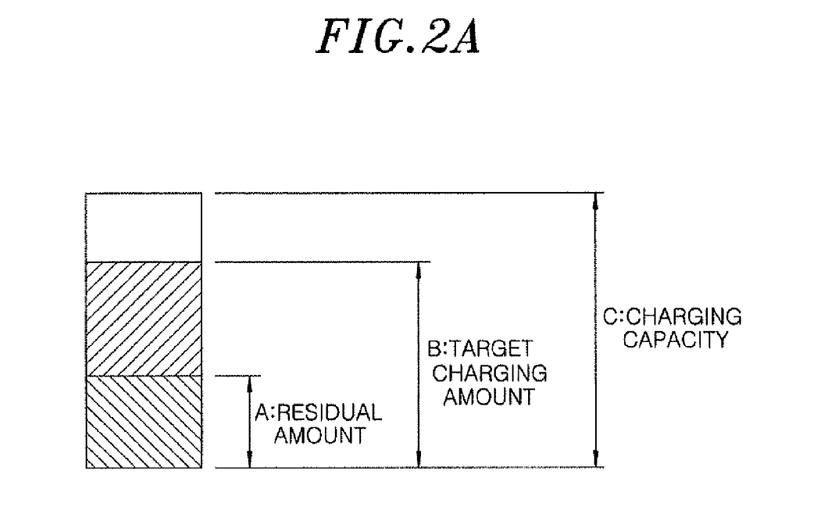
FIGS. 2A and 2B are explanatory views for explaining the relationship between a vehicle charging capacity, a target charging amount, a residual amount and a reserve amount in the charging control device.

Referring now to FIG. 2A, it is assumed that the residual amount of the battery mounted to each of the motor vehicles EV is A kWh, the target charging amount thereof being B kWh, the charging capacity thereof being C kWh and the reserve amount being E kWh. The schedule creating unit 1 allocates the difference power (indicated by non-hatched squares in FIG. 3B) between the maximum electric power and the in-use electric power to the respective motor vehicles EV on a time zone basis, and creates a schedule for charging each of the motor vehicles EV to the charging amount (B−E) obtained by subtracting the specified reserve amount E from the target charging amount B.

While it may well be desirable to fully charge all the motor vehicles EV to the charging capacity C, difficulties are encountered in doing so due to the relationship between the number of motor vehicles EV, the maximum electric power and the charging time. Furthermore, if the respective motor vehicles EV are charged one after another, the motor vehicles EV of later turns show very low charging amounts. This may make the users of such vehicles feel unsatisfactory.

Figure 2B:
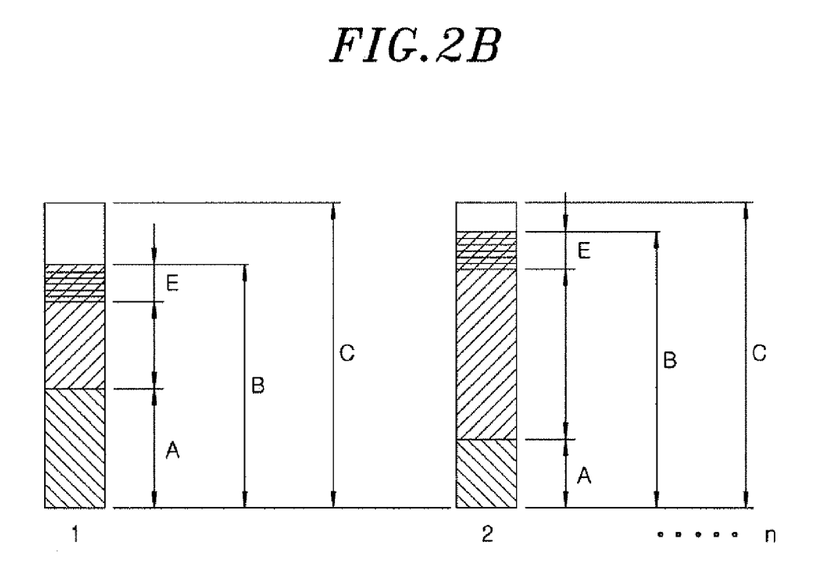

Accordingly, in an effort to simultaneously charge as many motor vehicles EV as possible and to lessen dissatisfaction of the users even when the motor vehicles EV are not fully charged, charging is performed to the amount (difference amount) obtained by subtracting the specified reserve amount E from the target charging amount B inputted by the users of the respective motor vehicles EV. The shortfalls of the target charging amount B are equally shared by the respective users. In the following description, it is assumed that the reserve amount E is equally set in all the motor vehicles EV (see FIG. 2B).

Next, description will be made on the process of creating a schedule with the schedule creating unit 1.

If one of the motor vehicles EV arrives at the building BD, the user connects the motor vehicle EV to one of the sockets CSi through the charging cable Lx. Using the operation input receiving unit 5 of the charging control device CT, the user inputs his or her own ID number, the departure time (expected driving start time) and the target charging amount B. In response, the operation input receiving unit 5 transfers the ID number, the departure time and the target charging amount B to the schedule creating unit 1. The target charging amount B kWh may be determined by inputting an expected upcoming travel distance km and causing the schedule creating unit 1 to calculate the target charging amount B based on the mileage km/kWh of the relevant motor vehicle EV and the expected travel distance km.

In the meantime, the control unit 2 detects the connection of the charging cable Lx to one of the sockets CSi and notifies the schedule creating unit 1 of the connection of the charging cable Lx. Then, the schedule creating unit 1 causes the storage unit 4 to store the connection time (arrival time) notified by the control unit 2, the departure time and the target charging amount B in a matching relationship with the ID number received from the operation input receiving unit 5 (see FIG. 4A). At this time, data may be transmitted between the charging-discharging control unit of the motor vehicle EV and the control unit 2 through the charging cable Lx, thereby enabling the control unit 2 to acquire the information on the residual amount (the residual amount A) of the battery mounted to the motor vehicle EV.

Figure 4A:
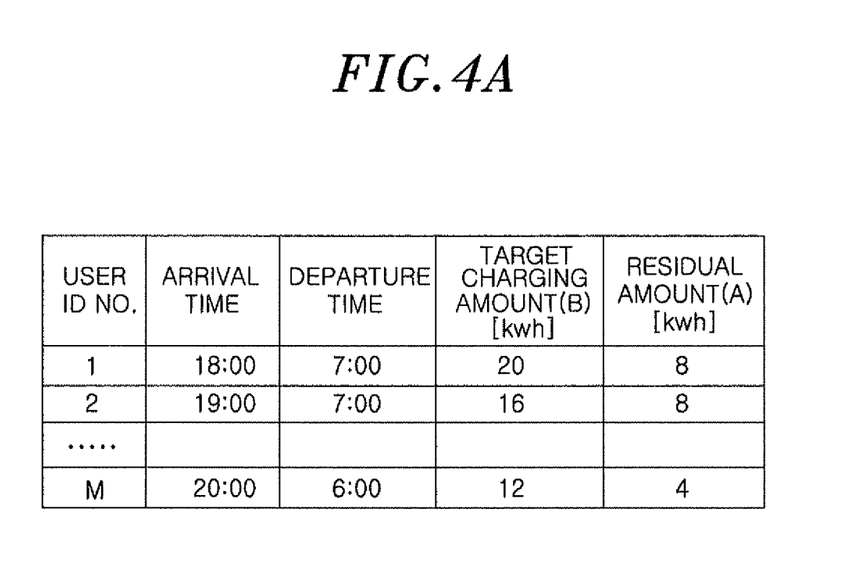
FIGS. 4A and 4B are explanatory views for explaining user-by-user vehicle use patterns in the charging control device.

Therefore, the schedule creating unit 1 causes the storage unit 4 to store the residual amount A acquired by the control unit 2 in a matching relationship with the ID number. In the storage unit 4, as shown in FIG. 4A, the ID numbers of the respective users and the information (hereinafter referred to as "charging reservation information") on the arrival time, the departure time, the target charging amount B and the residual amount A of the motor vehicles EV used by the respective users are stored in a data table.

Figure 4B:
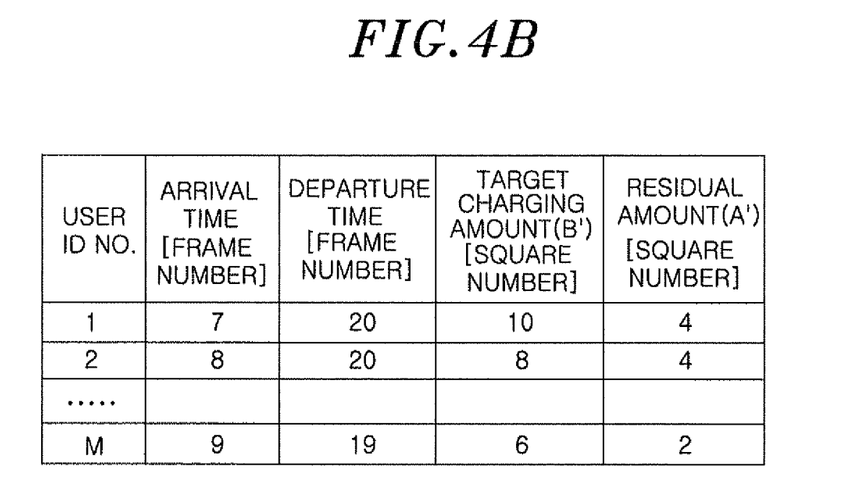

The schedule creating unit 1 converts the charging reservation information of the storage unit 4 as illustrated in FIG. 45 by replacing the arrival time and the departure time with the frame numbers (1 through 24) of the time frames and replacing the target charging amount B and the residual amount A with the numbers of squares corresponding to the electric energy amount. For example, if it is assumed that the arrival time is 18:00, the departure time is 7:00 of the next day, the target charging amount B is 20 kWh and the residual amount A is 8 kWh in the pre-conversion charging reservation information of ID number 1, the frame number of the arrival time is converted to 7, the frame number of the departure time to 20, the number of squares of the target charging amount B to 10 and the number of squares of the residual amount A to 4 in the post-conversion charging reservation information.

Pursuant to the post-conversion charging reservation information and the estimation results of the in-use electric power mentioned earlier, the schedule creating unit 1 creates a schedule for causing the control unit 2 to turn on or off the remote-controlled breakers RBi, so that the reserve amounts E can become as small as possible and can be uniform (preferably equal) in all the users (the motor vehicles EV).

Figure 5:
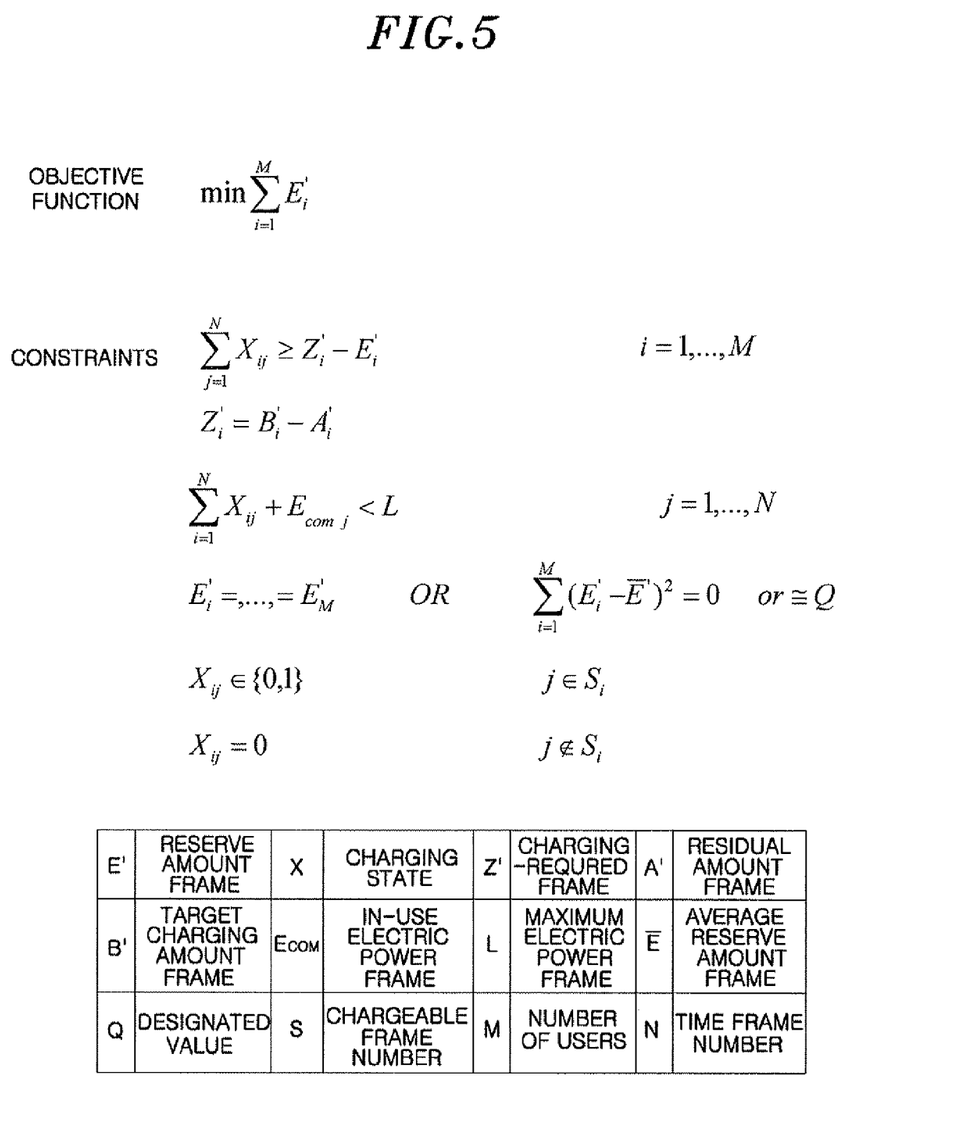
FIG. 5 is a view representing an objective function and constraints for determining a reserve amount when a schedule is generated in the charging control device.

Specifically, it is possible to use an optimization problem analysis method for finding an optimum solution needed to minimize an objective function (the sum of the reserve amounts E of all the motor vehicles EV) under specified constraints as represented in FIG. 5. The optimization problem analysis method is well-known and therefore will not be described in detail.

The schedule creating unit 1 determines the charging amount of the respective motor vehicles EV by subtracting the reserve amounts E from the target charging amounts B and creates a schedule in which the squares of the electric power usable for charging the motor vehicles EV in the respective time zones or time frames are allotted to the respective motor vehicles EV so as to fulfill the charging amounts.

Figure 6:
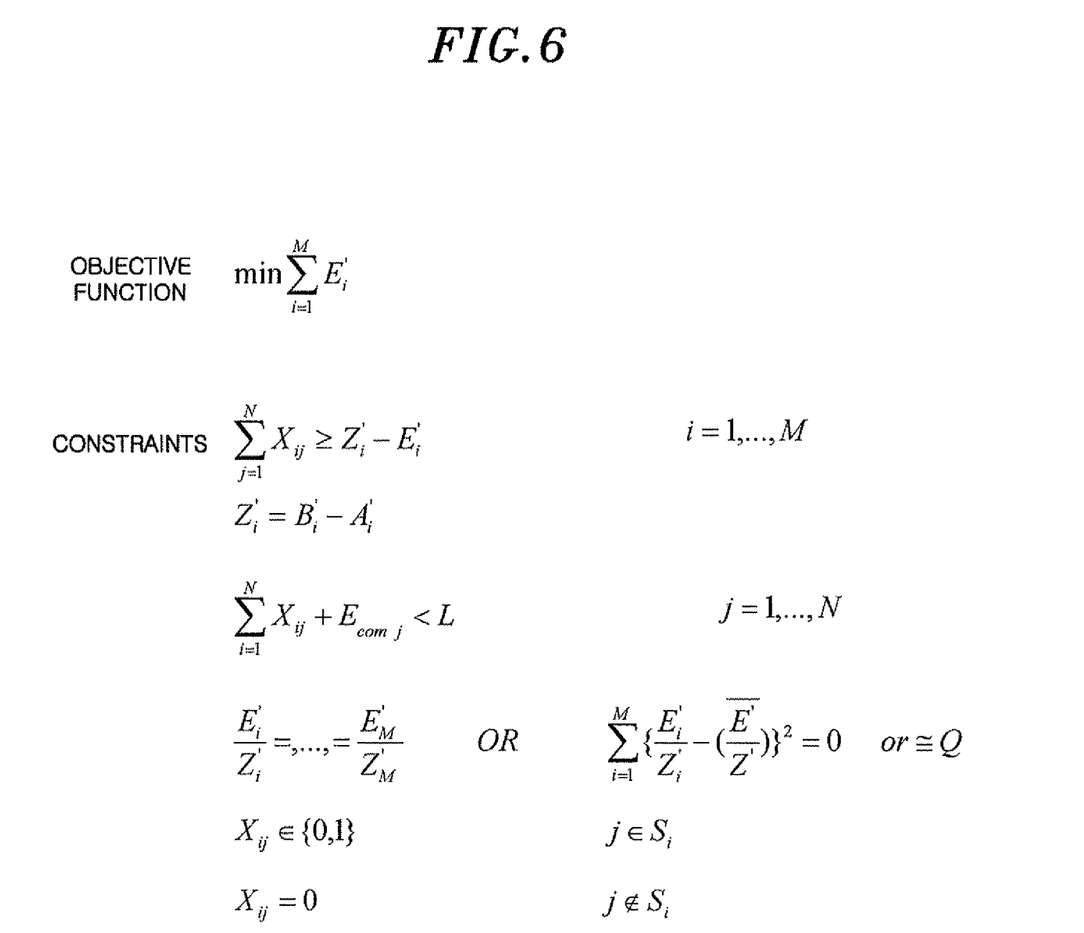
FIG. 6 is another view representing an objective function and constraints for determining a reserve amount when a schedule is generated in the charging control device.

However, the reserve amounts E are not necessarily set equal to each other in all the motor vehicles EV. For example, the reserve amounts E may be set to have a constant percentage with respect to the difference (B−A) between the residual amount A and the target charging amount B of each of the motor vehicles EV. In this case, as shown in FIG. 6, the schedule creating unit 1 may create a schedule using an optimum solution found by changing some of the constraints represented in FIG. 5. As another example, the reserve amounts E may be set to have a constant percentage with respect to the target charging amount B. In this case, the optimum solution may be found by assuming the residual amount A' in the constraints represented in FIG. 6 to be zero.

It may be supposed that the charging control device CT cannot acquire the target charging amount B due to the user's failure to input the target charging amount B or other causes. In this case, the reserve amount E may be set using the charging capacity C of each of the motor vehicles EV in place of the target charging amount B. When setting the reserve amount E and creating the schedule, the optimum solution may be found by replacing the target charging amount B' in the afore-mentioned constraints with the charging capacity C'.

Depending on the kinds of motor vehicles, it is sometimes the case that the control unit 2 of the charging control device CT cannot acquire the information on the residual amount A of the battery from the motor vehicles EV. If such is the case, the reserve amount E may be set by reckoning the residual amount A to be zero. When setting the reserve amount E and creating the schedule, the optimum solution may be found under the assumption that the residual amount A' in the afore-mentioned constraints is equal to zero. In the charging control device CT of the present embodiment, the control unit 2 merely closes or opens the charging routes pursuant to the schedule. This helps increase the possibility that the motor vehicles EV having greater residual amounts A are changed to the full amount (the charging capacity C).

It may be supposed that the charging control device CT cannot acquire the information on the departure time, the target charging amount B and the residual amount A due to the user's failure to input the information or other causes. Additionally, if the vehicle use patterns of the users (e.g., the departure time, the arrival time and the travel distance) are substantially fixed, it is preferable to omit the input of such information. The reason is that it is laborious and time-consuming for the users to input the information such as the target charging amount B every time (every day).

In this view, the individual users may register beforehand the information on their vehicle use patterns (e.g., the departure time, the arrival time and the travel distance) in the charging control device CT. The schedule creating unit 1 may create a schedule based on the vehicle use pattern information registered in advance. Instead of having the users register the information on their vehicle use patterns, the schedule creating unit 1 may create a schedule using the past records (history) of the user's vehicle use patterns (e.g., the departure time, the arrival time and the travel distance) stored in the storage unit 4. For example, it may be preferable to calculate and use the average values of the past departure time, the past arrival time and the past target charging amounts.

In this regard, it is preferred that the schedule creating unit 1 set the target charging amount B pursuant to the operation inputs received in the operation input receiving unit 5, estimate the ratio of the target charging amount B to the charging amount (B−E) obtained by subtracting the reserve amount E from the target charging amount B (which is called an achievement ratio: (B−E)/B%), and then cause the information presenting unit 6 to present the estimated achievement ratio. In other words, when the user inputs the target charging amount B, the information presenting unit 6 presents to the user an approximation (achievement ratio) indicating an expected actual charging amount. This enables the user to redefine the target charging amount B or to know the achievement ratio in advance, consequently offering enhanced convenience to the user.

It is also preferred that, while the control unit 2 controls the remote-controlled breakers RBi pursuant to the schedule, the schedule creating unit 1 cause the information presenting unit 6 to appropriately present to the user the information on the schedule, e.g., a charged amount (residual amount), an expected charging end time, a charging anomaly and a past charging record of each of the motor vehicles EV, which offers enhanced convenience to the user.

Next, description will be given on the gist of the present invention. It is believed that the achievement ratio mentioned above varies vehicle by vehicle. For example, the achievement ratio is expected to become lower as the sojourn time of each of the motor vehicles EV from the arrival time to the departure time grows shorter and as the target charging amount B of each of the motor vehicles EV grows higher.

In view of this, the charging control device CT of the present embodiment is configured to supply an electric power from the motor vehicle EV having a high achievement ratio to the motor vehicle EV having a low achievement ratio, thereby increasing the achievement ratio of the latter. Specifically, the control unit 2 of the charging control device CT searches the motor vehicles EV to find a specific motor vehicle whose charging is expected to be finished by the expected driving start time and causing the specific motor vehicle to discharge an electric power to be used in charging at least one of the motor vehicles EV other than the specific motor vehicle.

Figure 1C:
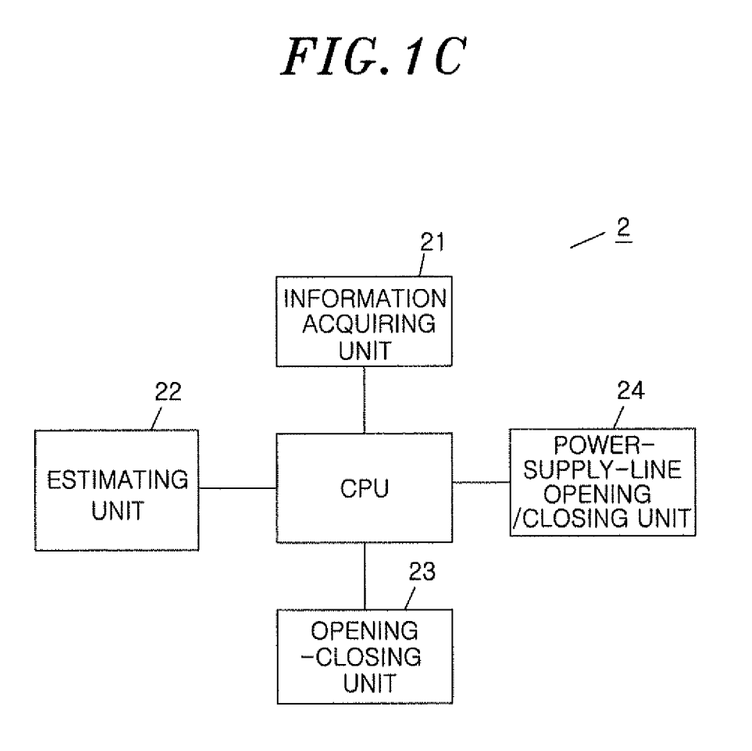
FIG. 1C is a block diagram showing a schematic structure of a control unit of the charging control device.

The control unit 2 of the charging control device CT may include an information acquiring unit 21 for acquiring information on a battery residual amount and a battery capacity from each of the motor vehicles EV; an estimating unit 22 for estimating the time required to charge each of the motor vehicles EV to a target charging amount obtained by subtracting the residual amount from the battery capacity; and an opening-closing unit 23 for opening or closing charging routes leading to the motor vehicles EV.

The control unit 2 searches the motor vehicles EV based on estimation results of the estimating unit to find a timely-chargeable motor vehicle that can be charged approximately to at least the target charging amount by the expected driving start time and a belatedly charged motor vehicle that cannot be charged to the target charging amount by the expected driving start time and then controls the opening-closing unit 23 to form a discharging route extending from the timely-chargeable motor vehicle to the belatedly charged motor vehicle. Further, the control unit 2 controls the opening-closing unit 23 to preferentially charge one of the motor vehicles EV smaller in the target charging amount than the remaining motor vehicles EV.

For example, it is presumed that there exist a motor vehicle EV1 having a departure time of 6:00 a.m. and a achievement ratio of 60% and a motor vehicle EV2 having a departure time of 9:00 a.m. and an achievement ratio of 100%. The control unit 2 turns on the remote-controlled breakers RB1 and RB2 to interconnect the sockets CS1 and CS2 to which the motor vehicles EV1 and EV2 are connected, and outputs a control command to a charging-discharging control unit of the motor vehicle EV2 having an achievement ratio of 100%, instructing the charging-discharging control unit to switch a charging operation to a discharging operation. At this time, other remote-controlled breakers RB3, etc., are kept turned off.

If the charging-discharging control unit of the motor vehicle EV2 stops a charger and operates a discharger in response to the control command, the electric power discharged from the motor vehicle EV2 is supplied only to the motor vehicle EV1. This is because the output voltage of the discharger of the motor vehicle EV2 is set higher than the system voltage (e.g., 100 V in effective value) of the alternating current power system AC. Accordingly, it is possible to increase the achievement ratio of the motor vehicle EV1 as compared with a case where the motor vehicle EV1 is charged with only the electric power of the alternating current power system AC. As a result, it becomes possible to reduce the number of motor vehicles EV that fail to finish charging (to the target charging amount B) by the departure time (the expected driving start time).

In the present embodiment, the electric power is directly supplied from the motor vehicle EV1 to the motor vehicle EV2. As an alternative example, the electric power discharged from the motor vehicle EV1 may be charged to an electric storage device (e.g., a lead battery) arranged between the main distribution board MB and the auxiliary distribution board SB, so that the electric power discharged from the electric storage device can be supplied to the motor vehicle EV2. It is sometimes the case that, if a plurality of motor vehicles EV having high achievement ratios exists, the motor vehicles EV cannot be simultaneously discharged due to the schedule. Even in this case, the time lag problem involved in discharging the motor vehicles EV can be resolved through the use of the electric storage device.

If all the motor vehicles EV are sufficiently charged and if a considerably long period of time is left before the departure time of the respective motor vehicles EV, the electric power discharged from the motor vehicles EV may be supplied to electric appliances when the consumption power of the electric appliances is likely to exceed the permissible extent of the contracted electric power specified by a contract with a power company. This makes it possible to prevent the consumption power from exceeding the contracted electric power. Specifically, the control unit 2 may turn on the remote-controlled breakers RBi to form power supply lines extending from the respective motor vehicles EV to the electric appliances.

In the present embodiment, the charging control device CT further includes power supply lines L1 extending from the motor vehicles EV to an electric appliance EA other than the motor vehicles EV, and the control unit 2 further includes a power-supply-line opening/closing unit 24 for opening or closing the power supply lines L1. The control unit 2 controls the power-supply-line opening/closing unit 24 to supply an electric power discharged from the motor vehicles EV to the electric appliance EA.

In case of vehicles for business purpose, delivery cars or rental cars, the users (drivers) are not in one-to-one correspondence with the motor vehicles EV. The users (e.g., sales persons or delivery persons) are allowed to arbitrarily select and use the motor vehicles EV remaining empty. Under these circumstances, if the electric power discharged from a motor vehicle EV1 having a low residual amount is supplied to a motor vehicle EV2 having a high residual amount so that the motor vehicle EV2 can be fully changed within a short period time, it becomes possible for the user who leaves at an early time to use the motor vehicle EV2. This helps reduce the electric energy amount charged and discharged between the motor vehicles EV, making it possible to reduce the power loss caused by the power conversion in a charger and a discharger.

While the invention has been shown and described with respect to the embodiments, it will be understood by those skilled in the art that various changes and modifications may be made without departing from the scope of the invention as defined in the following claims.

What is claimed is:

1. A charging control device for storing expected driving start time of each of motor vehicles and controlling charging operations of the motor vehicles in such a manner as to finish charging a battery mounted to each of the motor vehicles by the corresponding expected driving start time, the charging control device comprising:
 a storage unit for storing the expected driving start time of each of the motor vehicles; and
 a control unit for searching the motor vehicles to find a specific motor vehicle whose charging is expected to be finished by the expected driving start time and causing the specific motor vehicle to discharge an electric power to be used in charging at least one of the motor vehicles other than the specific motor vehicle.

2. The charging control device of claim 1, wherein the control unit includes:
 an information acquiring unit for acquiring information on a battery residual amount and a battery capacity from each of the motor vehicles;
 an estimating unit for estimating the time required to charge each of the motor vehicles to a target charging amount obtained by subtracting the residual amount from the battery capacity; and
 an opening-closing unit for opening or closing charging routes leading to the motor vehicles,
 wherein the control unit searches the motor vehicles based on estimation results of the estimating unit to find a timely-chargeable motor vehicle that can be charged approximately to at least the target charging amount by the expected driving start time and a belatedly charged motor vehicle that cannot be charged to the target charging amount by the expected driving start time and then controls the opening-closing unit to form a discharging route extending from the timely-chargeable motor vehicle to the belatedly charged motor vehicle.

3. The charging control device of claim 2, wherein the control unit controls the opening-closing unit to preferentially charge one of the motor vehicles smaller in the target charging amount than the remaining motor vehicles.

4. The charging control device of claim 2, further comprising:
 power supply lines extending from the motor vehicles to an electric appliance other than the motor vehicle,
 wherein the control unit further includes a power-supply-line opening/closing unit for opening or closing the power supply lines and controls the power-supply-line opening/closing unit to supply an electric power discharged from the motor vehicles to the electric appliance.

5. The charging control device of claim 3, further comprising:
 power supply lines extending from the motor vehicles to an electric appliance other than the motor vehicle,
 wherein the control unit further includes a power-supply-line opening/closing unit for opening or closing the power supply lines and controls the power-supply-line opening/closing unit to supply an electric power discharged from the motor vehicles to the electric appliance.

* * * * *